INVENTOR
FREDERICK G.J. GRISÉ
BY
Lewis M. Smith Jr.
ATTORNEY

# United States Patent Office 3,504,699
Patented Apr. 7, 1970

3,504,699
CHECK VALVE
Frederick G. J. Grisé, Barre, Mass., assignor to Grimar, Inc., Clinton, Mass.
Filed Mar. 20, 1967, Ser. No. 624,546
Int. Cl. F16k *15/14, 17/02, 7/12*
U.S. Cl. 137—525.1     5 Claims

ABSTRACT OF THE DISCLOSURE

A check valve with a rigid annular housing enclosing a flexible valve member having shaped and tapered opposite wall portions fitted freely but very closely within the housing to stabilize flat opposite wall portions interconnected thereby under back pressure, and multiple coacting stiffening ribs extending lengthwise of and projecting outwardly from each flat wall portion, and provided with projections from both flat wall portions deformed by said housing and operative through the stiffening ribs to maintain the open downstream ends of the flat wall portions in mutual engagement absent relatively higher pressure upstream than downstream.

CROSS-REFERENCE TO RELATED APPLICATION

The check valve of the instant invention desirably incorporates several features of the check valve described and illustrated in my copending application Ser. No. 437,463 filed March 5, 1965, now Patent No. 3,422,844 issued Jan. 21, 1969, including a flexible valve member having an annular collar with a rectangular cross section and offset both radially and longitudinally from the body portion of the flexible valve member and connected to the flexible valve member as an integral part thereof by means of a relatively narrow section in effect forming a circular hinge line adjacent to the collar, a rigid annular housing composed of interfitted male and female members so shaped and arranged as to support and sealably constrain the flexible valve member by clamping engagement with the annular collar thereof, and reinforcing ribs extending lengthwise part way along the opposite sides of the flexible valve member to increase its resistance to back pressure.

To the advantageous combination of features illustrated and described in my copending application Ser. No. 437,436, now Patent No. 3,422,844, the present invention adds additional important features described and claimed below.

BACKGROUND OF THE INVENTION

This invention relates to check valves and particularly to resilient dispensing valves.

The prior art includes Champion Patent No. 1,051,554 disclosing "a valve comprising a rubber cap 20 conical at its bottom and formed with a transverse rib 21 which is longitudinally slitted as at 22, the resilient end of the rubber tending to keep the slit normally closed and pressure upon the conical bottom of the valve tending to keep the slit closed" provided with an unnumbered single pair of short stiffening ribs on opposite sides of the slitted rib 21; Rang Patent No. 1,930,107 disclosing a lip valve member 8 comprising a rubber cap with walls 15 enclosing a chamber 16 in which "An extension of the walls 15 constitutes the conical member 18 and the lips 20 in which lips is located a slit 21 so that the lips 20 form essentially a collapsed sheath."; and Kravanga Patent No. 2,662,724 disclosing a modification in which "The outlet section, indicated by 44 is made flat without the marginal reinforcing ribs." and "The outer end of the upper wall 45 of the outlet section is povided with a thick bead 46 which serves to weigh down the end . . . to effect a seal in the region 44 when the pressure inside the valve member does not exceed the pressure outside of it."

The particular patents identified and described briefly above are representative of the prior art in the field of invention wherein the flattened downstream end of the flexible valve member in a typical check valve assembly comprises a pair of flat lip portions arranged to be in mutual engagement and parallel to each other over a substantial portion of the length of the flexible valve member when there is no pressure differential across the flexible valve member. However, lacking fully effective means for stablizing their orientation in mutual engagement under a no load condition, these flat lip portions are subject to slight residual distortion resulting from their periodic deflection in normal use. Consequently, these flat lip portions tend not to maintain a tight seal as they should at all times when the upstream pressure is not higher than the downstream pressure. Instead, these slightly distorted flat lip portions tend to stand apart at least slightly, until the downpressure reaches a level higher than the upstream pressure.

SUMMARY OF THE INVENTION

The check valve embodying the instant invention provides a rigid annular housing forming a chamber enclosing and sealably supporting an improved flexible valve member including a first pair of flat and relatively flexible wall portions extending the full length of the flexible valve member from an annular collar at its open upstream end to a line of intersection along a slit extending transversely of its flattened downstream end, and also including a tapered second pair of relatively stiff wall portions fitted freely within, but conforming to and disposed very close to, the adjoining portions of the surface of the chamber formed within the rigid annular housing.

Each of the flat relatively flexible wall portions is further stabilized lengthwise of the flexible valve member by multiple relatively narrow and closely adjacent ribs projecting outwardly therefrom and extending the full length of each flat wall portion and coacting to resist deflection lengthwise of such flat wall portions under back pressure from the downstream end of the check valve assembly.

In addition, protuberant biasing means on opposite sides of the flexible valve member adjacent the annular collar at its open upstream end coact with the inner surface of the valve chamber formed within the rigid annular housing to produce a biasing effect operative through the multiple ribs described above to maintain in mutual engagement the transversely extending lips at the downstream ends of the flat relatively flexible side portions of the flexible valve member, so long as the downstream pressure is not exceeded by the upstream pressure.

Thus, the instant invention provides cooperating means for stabilizing the flat relatively flexible wall portions of the flexible valve member within the chamber formed by the rigid annular housing, and provides biasing means incorporated on both sides of the flexible valve member and coacting with the rigid annular housing to maintain the downstream ends of the flat relatively flexible wall portions of the flexible valve member in mutual engagement to close the check valve assembly whenever the upstream pressure on the valve assembly does not exceed the downstream pressure.

Consequently, a check valve assembly embodying the instant invention not only inhibits the gross deflection of the flexible valve member under transient conditions which may result in a residual distortion of the lips at the downstream end of the flexible valve member, but also overcomes residual distortion of the lips at the downstream end of the flexible valve member due solely to the normal deflections of the flat relatively flexible wall portions

3 necessary to pass a fluid from the upstream side to the downstream side of the check valve assembly.

BRIEF DESCRIPTION OF THE DRAWING

The accompanying drawing shows various features of the preferred embodiment of the instant invention illustrated in seven separate views wherein.

DESCRIPTION OF THE PREFERRED EMBODIMENT

Figure 1:
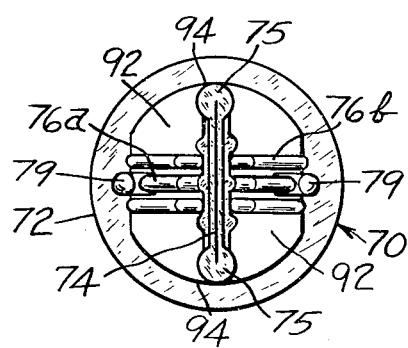
FIG. 1 is a plan view of the flexible valve member embodying the instant invention.
Figure 2:
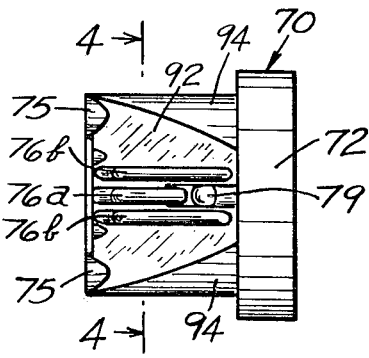
FIG. 2 is a first side elevation of the flexible valve member as seen from the right side of FIG. 1.
Figure 3:
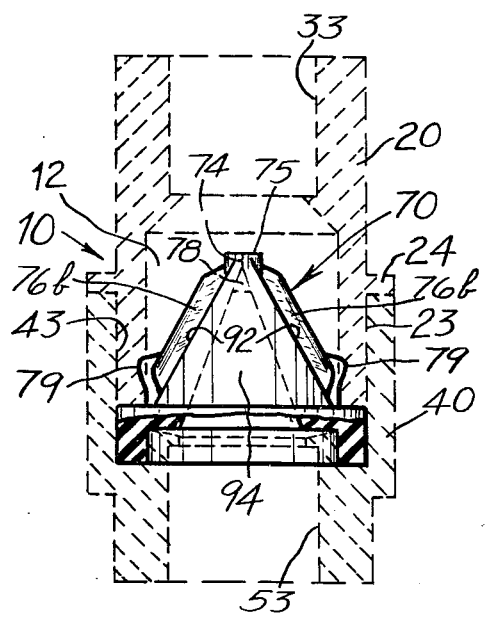
FIG. 3 is a second side elevation of the flexible valve member, partially broken away, viewed on an azimuth 90° from that of the showing in FIG. 2.

Referring now to the drawing, wherein like reference numerals identify like or corresponding parts, FIGS. 1 and 2 show various features of the preferred embodiment of a flexible valve member for a check valve, generally designated by the reference numeral 10, and arranged to be mounted sealably within a rigid annular housing composed of interconnected tubular elements 20 and 40 in the manner indicated by the showing in FIGS. 3 and 4.

Referring again to FIGS. 1 and 2, the flexible valve member generally designated by reference numeral 70 comprises an offset annular collar 72 useful in the manner described further below and a body including a first pair of flat and relatively flexible wall portions 92 extending lengthwise of the body of the flexible valve member from a line adjacent the annular collar 72 at its open upstream end to a line of intersection along a slit 74 extending transversely of its flattened downstream end, and a second pair of arcuately shaped relatively stiff wall portions 94 tapered lengthwise of the body of the flexible valve member and arranged to be fitted freely within, but to conform very closely to, the adjoining portions of the inner surface of a rigid annular housing in which the flexible valve member is mounted.

FIGS. 1 and 2, as well as the other figures in the drawing, also include a showing of multiple elongated ribs 76a and 76b formed integrally with and to project outwardly from each of the flat wall portions 92 along substantially the entire length of the body of the flexible valve member. Each of the flat wall portions 92 also has formed integrally therewith a protuberant knob 79 superimposed upon the central rib 76a as shown best in FIGS. 1 and 2, and arranged to project radially from the body of the flexible valve member in the manner shown best in FIG. 3.

Referring particularly to FIG. 3 in which the collar 72 of the flexible valve member 70 is shown in section and in operative relation to dotted line representation of the interfitted tubular elements 20 and 40 together forming a re-entrant annular recess of such a lengthwise dimension when the external flange 24 on the element 20 is seated against the adjacent ends of the element 40 that the collar 72 is compressed sufficiently within the re-entrant annular recess to form an effective fluid seal.

As suggested by the dotted outlines in FIG. 3, the rigid annular housing may consist of a cylindrical male element 20 with a cylindrical outer surface 23 and a cylindrical female element 40 with a cylindrical inner surface 43, the elements 20 and 40 being bonded together in the relative positions indicated in FIG. 3 by a suitable adhesive applied between the cylindrical outer surface 23 of the element 20 and the cylindrical inner surface 43 of the element 40.

The flexible valve member 70 may alternatively be sealably mounted within a rigid annular housing comprising tubular elements 20 and 40 threaded on their adjacent cylindrical surfaces as shown in my copending application Ser. No. 437,463, now Patent No. 3,422,844 but in either case, the body of the flexible valve member is connected to the collar 72 through an annular section relatively reduced in cross section so that it forms a circular hinge line about which the respective wall portions of the body of the flexible valve member are relatively easily displaced.

The tapered second pair of relatively stiff wall portions 94 conform precisely over their entire outer surfaces with the coacting surfaces of the valve chamber 12, so that there is no clearance between the surfaces of these wall portions and the inner surface of the rigid annular housing. Consequently, these wall portions are fully constrained against outward radial deflection under back pressure applied against the downstream side of the flexible valve member, yet free to pivot inwardly when the first pair of flat wall portions are deflected outwardly to open slit 74 and pass fluid through the check valve.

Figure 4A:
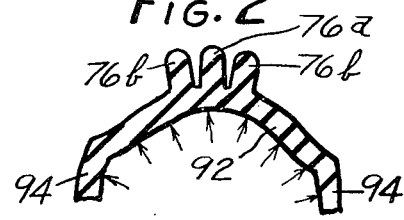
FIG. 4a is a partial section taken on line 4—4 of FIG. 2 showing the configuration of the flexible valve member when it is subjected to a relatively high upstream pressure represented by the arrows in FIG. 4a, to open the slit therethrough.
Figure 4B:
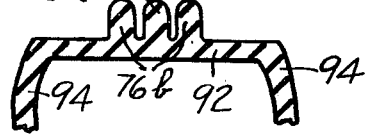
FIG. 4b is a partial section taken on line 4—4 of FIG. 2 showing the configuration the flexible valve member assumes when there is no pressure differential between the upstream and downstream sides of the check valve assembly in which the flexible valve member is incorporated.

The first pair of flat and relatively flexible wall portions 92 interconnecting and supported by the tapered second pair of relatively stiff wall portions are thereby stabilized under back pressure substantially in the wide angled stance illustrated in FIG. 3 in mutual engagement only at the downstream end of the flexible valve member along the slit 74, and they are further stabilized in this position under back pressure by the stiffening effect of the multiple ribs 76a and 76b extending over almost the entire length of each of the first pair of wall portions, and disposed closely side by side as shown in FIG. 4b in the absence of a pressure differential across the check valve.

Since the respective ribs 76a and 76b are each relatively narrow in cross section and are separated by narrow channels or grooves therebetween, they separate readily and offer no appreciable resistance to the deflection of a flat wall portion 92 as shown in FIG. 4a under the influence of upstream pressure, represented by the arrows illustrated in FIG. 4a, effective to open the slit 74 and pass a fluid through the check valve.

Figure 4C:
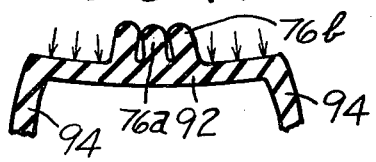
FIG. 4c is a partial section taken on line 4—4 of FIG. 2 showing the configuration of the flexible valve member when it is subjected to a relatively high downstream back pressure represented by the arrows shown in FIG. 4c.

Conversely, since the respective ribs 76a and 76b are spaced closely adjacent to each other and have relatively deep cross sections, a relatively small inward deflection of the flat wall portion 92 under back pressure represented by the arrows illustrated in FIG. 4c brings the outer free edges of the respective ribs into mutual engagement as shown in FIG. 4c, so that they are jointly effective to resist further inward deflection of the flat wall portion 92.

Thus, the resistance to undesirable deflection of the first pair of flat wall portions 92, which is provided by the shaped and tapered second pair of wall portions fitted precisely within the valve chamber 12, is increased by the multiple closely spaced ribs extending lengthwise of each of the flat wall portions 92.

Notwithstanding the provisions described above for preventing gross deflections of the more flexible portions of the flexible valve member, the first pair of flat wall portions of the body of the flexible valve member 70 are deflected outwardly about the circular hinge line described above periodically during normal operation of the check valve, with the probability that these flat wall portions will eventually accumulate sufficient residual distortion so that the slit 47 will tend not to close tightly absent a downstream pressure substantially higher than the upstream pressure.

Since this tendency of these flexible valve members to remain open slightly when the pressure is substantially the same on both sides of the check valve is undesirable in some applications, the flexible valve member 70 described and illustrated herein also includes a pair of protuberant knobs 79 formed integrally with the body of the flexible valve member and disposed as shown best in FIG. 3, so they span a distance greater than the diameter of the valve chamber 12 indicated by the dotted outline thereof in FIG. 3.

Figure 5:
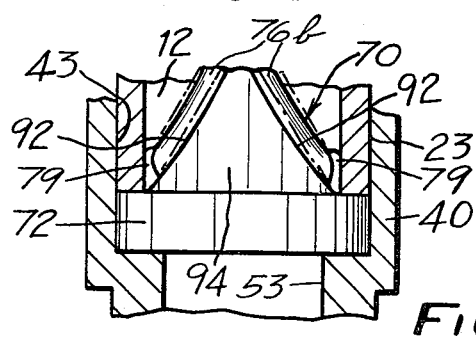
FIG. 5 is a side elevation of the flexible valve member corresponding to that illustrated in FIG. 3, but showing the flexible valve member in operative relation to the elements of the rigid annular housing, which with the flexible valve member forms a check valve assembly.

Accordingly, when the flexible valve member 70 is fully seated within the rigid annular housing composed of tubular elements 20 and 40, the protuberant knobs 79 are compressed and deflected into the configuration shown in FIG. 5, so that they act through the ribs 76a and adjoining ribs 76b to bias the respective flat wall portions 92 into engagement along the transverse slit 74 at all times except when a relatively higher upstream pressure produces a pressure differential across the check valve effective to open the slit 74 by the outward deflection of the flat wall portions 92. The ribs 76b represented by solid lines in FIG. 5 illustrate the positions assumed by the ribs under the biasing effect of the knobs 79 as compared to their unbiased positions represented by phantom lines in FIG. 5.

It should be understood both the size and the number of the ribs 76a and 76b may be varied as necessary to develop the desired degree of resistance to deflection under various operating conditions. Moreover, it should be understood the protuberant knobs 79 may be shaped and arranged to overlie two or more of the parallel ribs in order to achieve the desired biasing effect for various applications, provided the configuration selected for the knobs does not unduly restrain the relative angular displacement of the respective ribs under the condition illustrated in FIG. 4a.

For some applications, the flexible valve member 70 may be modified to omit therefrom the ribs 76a and 76b entirely, in which case, the protuberant knobs 79 formed integrally with the flexible valve member 70 will act directly and solely through the flat wall portions 92 to bias these wall portions into engagement along the slit 74 at all times except when a relatively higher upstream pressure produces a pressure differential across the check valve effective to open the slit 74 by the outward deflection of the flat wall portions 92.

In order to provide a tight seal, the slit 74 is formed simply by passing a sharp knife through the flattened downstream end of the flexible valve member 70. Consequently, the ends of slit 74 need to be protected against tearing when the wall portions 92 are deflected outwardly. Such protection is afforded here by a pair of C-shaped butresses 75 at the downstream ends of the wall portions 94 and encircling the respective ends of the slit 74, and also by a pair of internal shoulders 78, each with an arcuately curved inner surface immediately adjacent one end of the slit 74.

What is claimed is:

1. A check valve comprising, a rigid annular housing arranged to be mounted in a hollow conduit for transmitting a fluid from an upstream inlet to a downstream outlet and forming a valve chamber therewithin, and a hollow flexible valve member mounted within said valve chamber and in sealable engagement around its entire periphery with said rigid annular housing, said flexible valve member having a body extending from an open upstream end to a flattened downstream end with a transverse slit therethrough and including a pair of flat wall portions angularly offset on opposite sides of said transverse slit, each said flat wall portion being provided with multiple immediately adjacent elongated ribs all projecting outwardly therefrom and extending lengthwise of said flat wall portion from the upstream end to the downstream end of the body of said flexible valve member.

2. A check valve as described in claim 1, wherein, the body of said flexible valve member also includes a pair of wall portions each reduced peripherally from a wide base at the upstream end thereof to a narrow tip at the downstream end thereof and each contoured over its entire outer surface to fit freely but very closely within the valve chamber formed by said rigid annular housing.

3. A check valve as described in claim 1, wherein, the body of said flexible valve member also includes an opposed pair of biasing means projecting outwardly from opposite sides and at the upstream end thereof adjacent said ribs, so said opposed biasing means are both engaged and biased inwardly by said rigid annular housing when said flexible valve member is mounted within the valve chamber of said rigid annular housing, whereby said biasing means acts through said ribs to maintain said flat wall portions in mutual engagement along said transverse slit whenever the upstream pressure on the check valve does not exceed the downstream pressure thereon.

4. A check valve comprising a rigid annular housing arranged to be mounted in a hollow conduit for transmitting a fluid from an upstream inlet to a downstream outlet, and a hollow flexible valve member mounted fixedly within and sealably engaged by said rigid annular housing, said flexible valve member being tapered along its length on opposite sides thereof from an open upstream end to a flattened downstream end with a transverse slit therethrough and being provided with opposed biasing means projecting outwardly from its opposite sides adjacent the upstream end thereof, so as to be engaged and deformed centerward of the flexible valve member when it is fixedly mounted in the rigid annular housing, whereby said slit at said downstream end is maintained closed and sealed absent upstream pressure greater than the downstream pressure, said flexible valve member including also a pair of flat relatively flexible wall portions both extending lengthwise thereof from said opposed biasing means to said slit, and each said flat wall portion being provided with multiple elongated closely spaced ribs projecting outwardly therefrom and extending lengthwise thereof from one of said biasing means to one side of said transverse slit, whereby said multiple ribs are biased into mutual engagement by inward deflection of the flat wall portion, responsive to downstream pressure greater than upstream pressure.

5. A check valve as described in claim 4, wherein, said flexible valve member also includes a relatively stiff second pair of wall portions of diminishing circumferential width lengthwise of the flexible valve member from wide bases at the upstream end thereof to narrow tips at the downstream end thereof and contoured over their entire outer surfaces to fit freely but very closely within said rigid annular housing.

References Cited

UNITED STATES PATENTS

| | | | |
|---|---|---|---|
| 615,751 | 12/1898 | Sands | 137—525.1 |
| 1,051,554 | 1/1913 | Champion | 137—525.1 X |
| 2,064,695 | 12/1936 | Sipe | 137—525.1 |
| 2,352,642 | 7/1944 | Langdon | 137—525.1 |
| 3,369,666 | 2/1968 | Hultgren et al. | 137—525.1 X |

GEORGE F. MAUTZ, Primary Examiner